United States Patent
Reid et al.

(10) Patent No.: US 6,359,219 B1
(45) Date of Patent: Mar. 19, 2002

(54) DECORATIVE ELECTRICAL BOX

(76) Inventors: William E. Reid, 13 Gentry La., Uxbridge, MA (US) 01569; James F. Rideout, 3 Lawnwood, Conventry, RI (US) 02816

(*) Notice: Subject to any disclaimer, the term of this patent is extended or adjusted under 35 U.S.C. 154(b) by 0 days.

(21) Appl. No.: 09/684,427

(22) Filed: Oct. 10, 2000

(51) Int. Cl.⁷ .................................................. H02G 3/08
(52) U.S. Cl. ........................... 174/50; 174/66; 174/67; 220/3.3
(58) Field of Search ........................... 174/66, 67, 48, 174/49, 50, 55; 220/241, 3.8, 3.3, 4.03

(56) References Cited

U.S. PATENT DOCUMENTS

| | | | |
|---|---|---|---|
| 2,515,820 A | * 7/1950 | Clark | 174/66 |
| 2,612,283 A | * 9/1952 | Cole | 220/3.8 |
| 2,824,662 A | * 2/1958 | Cole | 220/3.8 |
| 4,247,738 A | 1/1981 | Bonato | |
| 4,390,105 A | 6/1983 | Graves | |
| 4,599,485 A | 7/1986 | Smolik | |
| 5,042,673 A | * 8/1991 | McShane | 220/3.7 |
| 5,117,996 A | * 6/1992 | McShane | 220/3.7 |
| 5,456,373 A | * 10/1995 | Ford | 220/242 |
| 5,638,481 A | 6/1997 | Arnett | |
| 5,959,246 A | * 9/1999 | Gretz | 174/50 |
| 6,166,329 A | * 12/2000 | Oliver et al. | 174/66 |
| 6,239,365 B1 | * 5/2001 | McEvers | 174/50 |

* cited by examiner

Primary Examiner—Dean A. Reichard
Assistant Examiner—Angel R. Estrada
(74) Attorney, Agent, or Firm—Richard C. Litman

(57) ABSTRACT

A method and apparatus for flush-mounting a decorative electrical circuit box for supporting an electrical accessing unit. More specifically, a method and apparatus for flush-mounting a face plate of an electrical circuit box with a finished wall surface for aesthetic purposes. Newly constructed building structures have a great need for flawless walls for improving the aesthetic features of the structures. Likewise, in existing structures, improvements in aesthetics increase the presumed value. The electrical circuit box, generally disposed behind a wall, has an open front. The electrical accessing unit is fixed within the electrical circuit box, and a faceplate covers the open front, allowing access only to the electrical accessing unit. In order to make the wall surface flat and smooth, the faceplate must be mounted flush with the surface of the wall.

5 Claims, 6 Drawing Sheets

DECORATIVE ELECTRICAL BOX

BACKGROUND OF THE INVENTION

1. Field of the Invention

The present invention relates to a method and apparatus for flush mounting an electrical circuit box. More specifically, the invention relates to a method and apparatus for flush mounting a decorative faceplate of an electrical circuit box with a finished wall surface.

2. Description of Related Art

Several unsuccessful attempts have been made to flush mount face plates of circuit boxes with a wall surface. Prior art devices generally produce a box disposed in a wall hole. However, unappealing flaws exist when gaps and grooves between the circuit box and the wall hole are not properly aligned within minimal tolerances.

For example, U.S. Pat. No. 4,247,738 issued Jan. 27, 1981, to Bonato, discloses a flush mounted electrical box assembly anchored to a base. The position of the box can be adjusted so as to make the surface of the box appear flush with the wall surface.

U.S. Pat. No. 4,390,105 issued Jun. 28, 1983, to Graves, discloses an electrical outlet box having a mounting bracket allowing the outlet box to be flush-mounted in any wall irrespective of the thickness thereof. The mounting bracket taught in Graves, like the mounting bracket taught in Bonato, must be secured to a base in order to adjust the surface position of the outlet box.

U.S. Pat. No. 4,599,485 issued Jul. 8, 1986, to Smolik, discloses an electrical receptacle box assembly having an electrical receptacle box, a removable cover, and an offset mounting frame. The mounting frame includes positionally adjustable mounting brackets for accommodating and flush-mounting to wall surfaces, regardless of surface irregularities.

U.S. Pat. No. 5,638,481 issued Jun. 19, 1997, to Arnett discloses a flush-mounted universal outlet for use with optical fibers and electrical cables, having a hinged wall plate adapted to be mounted to a standard outlet box.

None of the above inventions and patents, taken either singly or in combination, is seen to describe the instant invention as claimed.

SUMMARY OF THE INVENTION

Newly constructed structures for dwellings, businesses, etc. have a great need for flawless inside wall surfaces for improving aesthetics and thus increasing the value of the structures. Likewise, in existing structures, improvements in aesthetics increases the value of the structures. The need exists for making the wall surfaces as flat and as smooth as possible. The present invention provides an aesthetically appealing, yet inexpensive apparatus and method for ensuring smooth and flat wall surfaces. The present invention flush mounts an electrical circuit box for supporting an electrical accessing unit. Electrical accessing units include light switches, outlets, dimmers, intrusions detectors, illumination devices, telephone outlets, CATV outlets, etc. The electrical circuit box is generally disposed behind the wall and has an open front, wherein an electrical accessing unit is fixed within the circuit box, and a faceplate covers the open front, allowing access to the electrical accessing unit. In order to make the wall surface flat and smooth, the faceplate must be flush with the surface of the wall.

Accordingly, it is a principal object of the invention to provide a flush-mounted decorative electrical circuit box faceplate.

It is another object of the invention to provide a flush-mounted decorative electrical circuit box having an enlarged flange extending therearound.

It is a further object of the invention to provide a flush-mounted decorative electrical circuit box having an enlarged flange and an encircling trim ring for establishing a decorative flush finish.

Still another object of the invention is to provide a method of installing a flush-mounted decorative electrical circuit box having an enlarged flange and an encircling trim ring for establishing a decorative flush finish.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
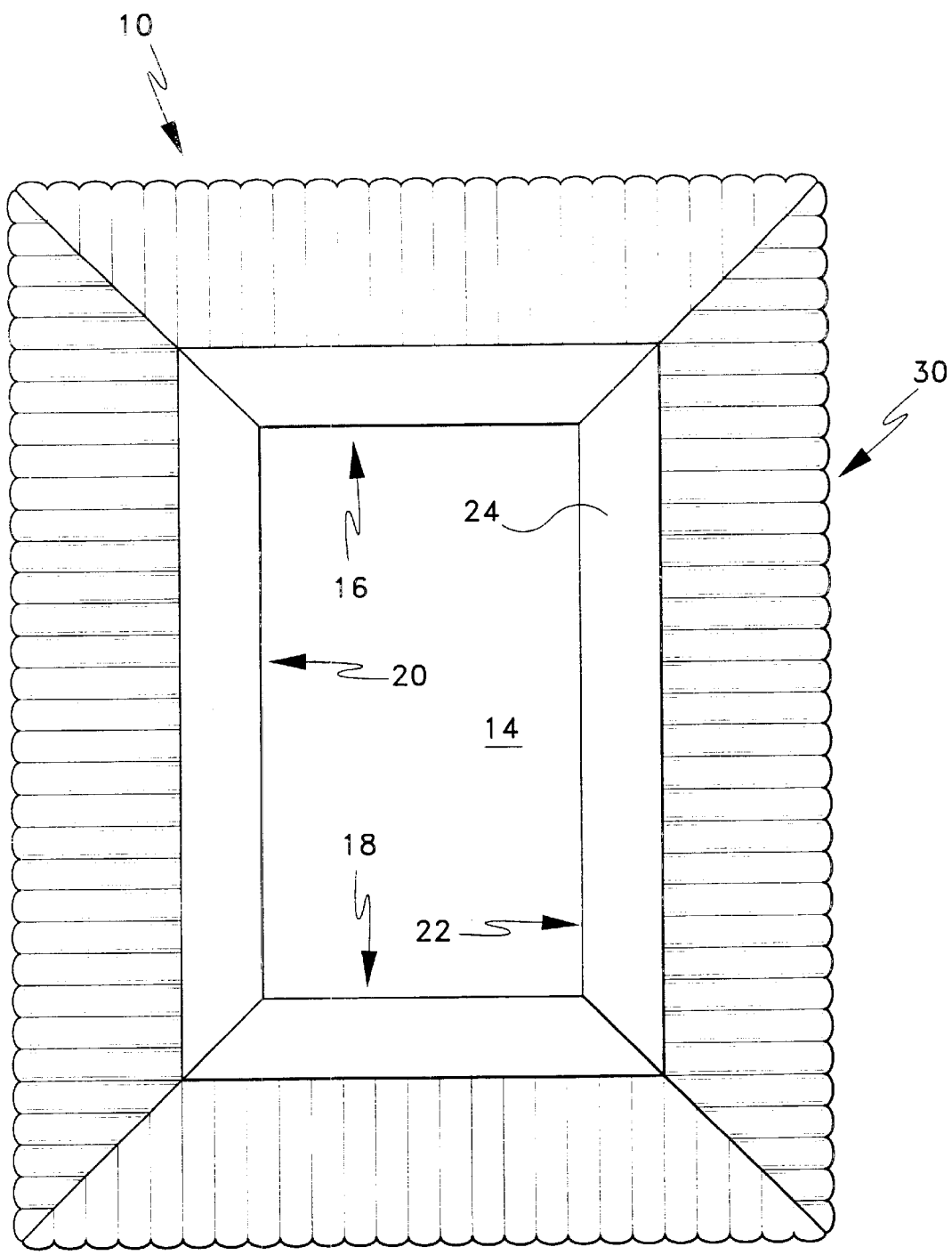
FIG. 1 is an elevational view of a trim ring disposed on a decorative electrical box according to the present invention.
Figure 2:
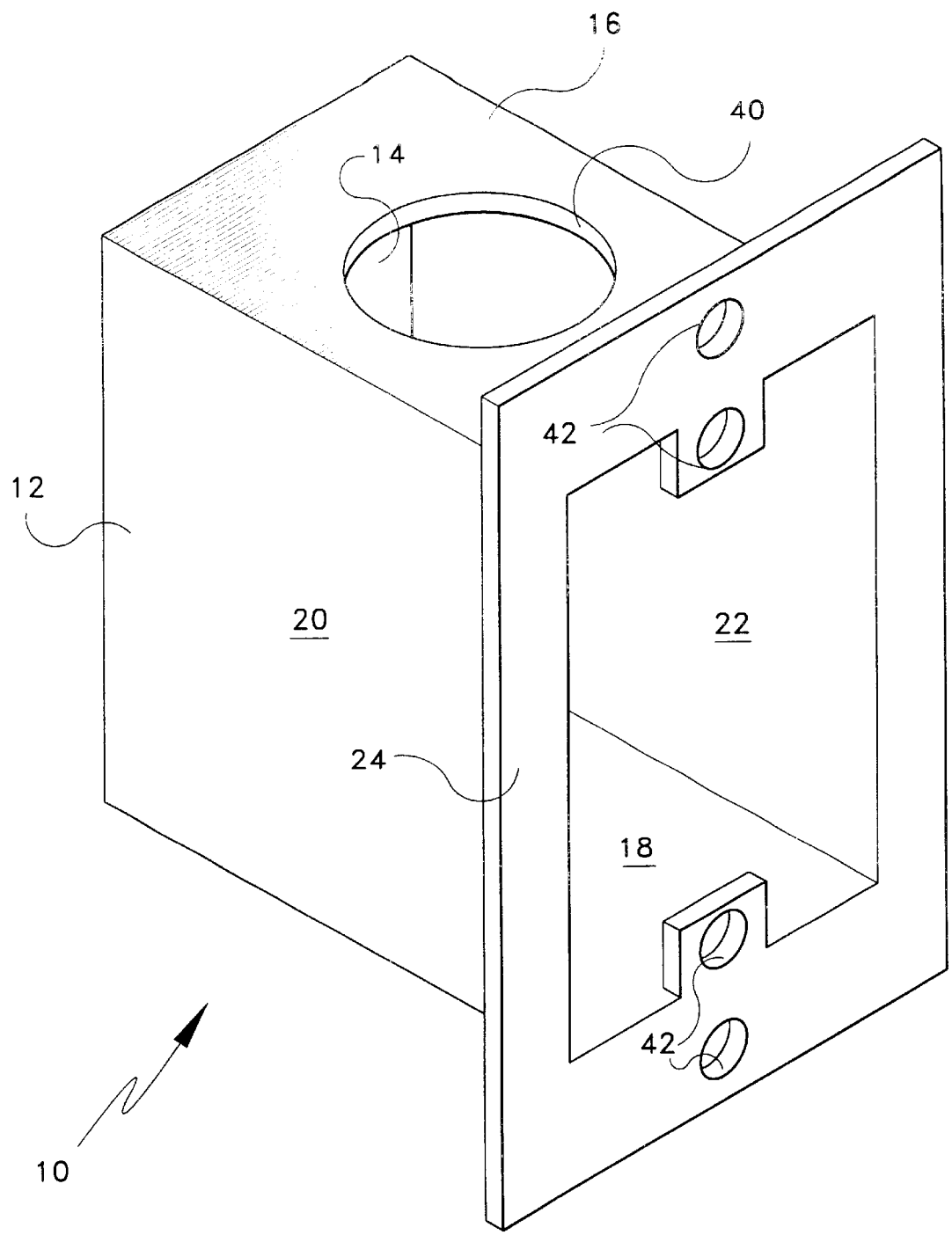
FIG. 2 is a perspective view of an electrical box used in accordance with the present invention.

The present invention is a circuit box and method of flush-mounting a circuit box to a surrounding wall surface. FIGS. 1–4 illustrate a decorative electrical circuit box 10 for establishing a flush-mounted faceplate 50 of a wall-accessible circuit unit 60. The decorative electrical box 10 has a generally rectangular housing 12. The housing 12 includes a rear wall 14, a top wall 16, a bottom wall 18, a left side wall 20, and a right side wall 22.

Surrounding the box 10 is an enlarged flange 24. The walls 14, 16, 18, 20, 22 are arranged to create an open front (seen clearly in FIG. 2). The enlarged flange 24 increases the area of the box which engages with the faceplate 50.

In order to firmly establish the flush mounting 54, the decorative electrical circuit box 10 should be disposed in an opening formed in the wall surface 52 such that the enlarged flange is slightly recessed in the opening. The back side of the flange 24 would rest against the framing 70 of the wall. The wall surface 52 is generally routed around the opening forming a recess for a trimming ring 30. Trimming ring 30 encircles the flange 24 of the electrical circuit box 10.

Figure 3A:
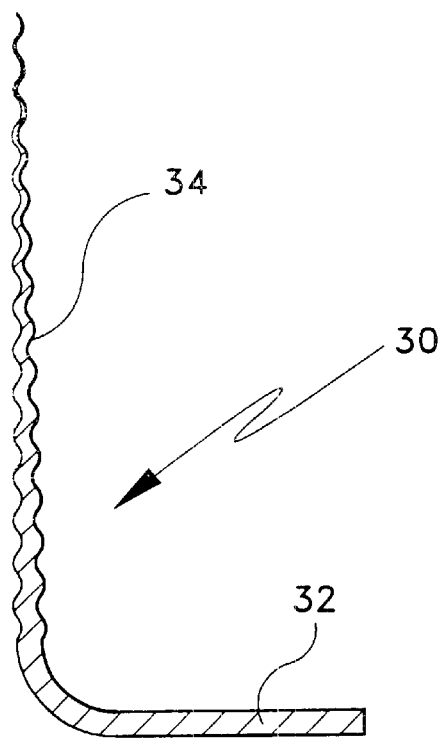
FIGS. 3A and 3B are cross sectional views of trim rings used in accordance with the present invention.
Figure 3B:
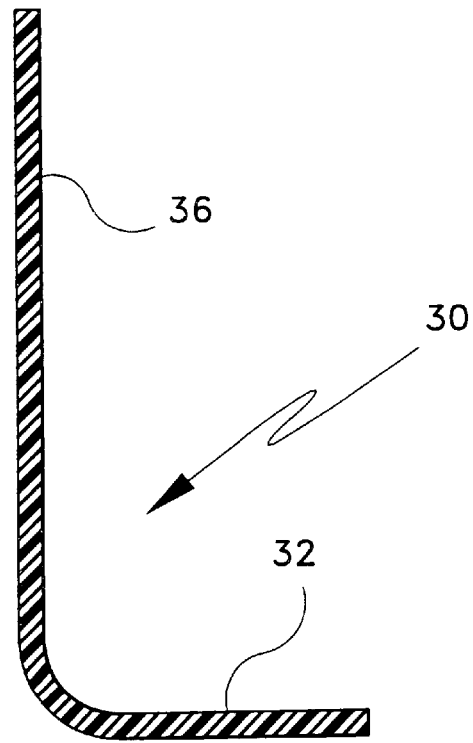
Figure 4:
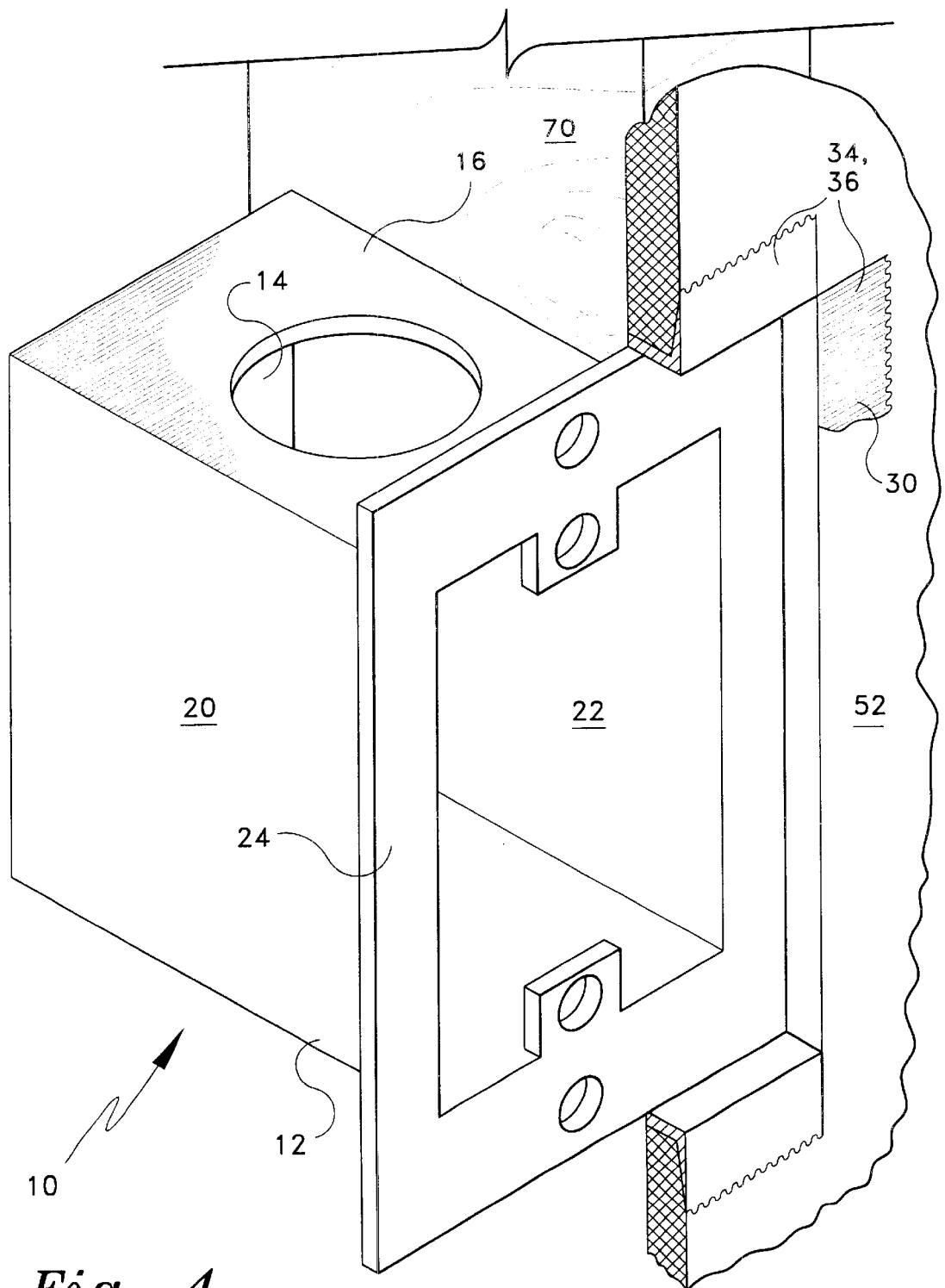
FIG. 4 is a fragmented, environmental, perspective view of a decorative electrical box according to the present invention.
Figure 5:
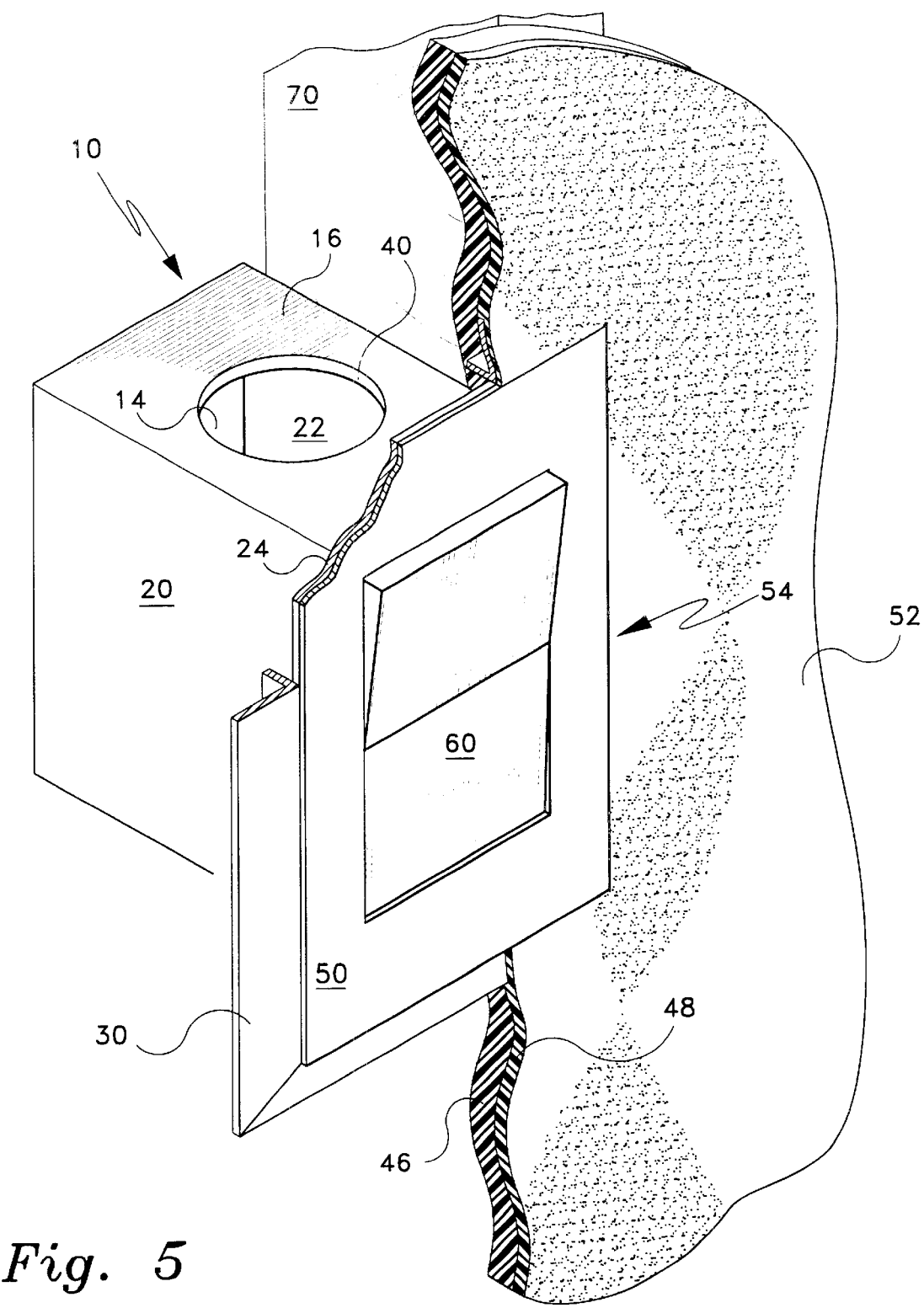
FIG. 5 is a fragmented, environmental, perspective view of a decorative electrical box and finished wall according to the present invention.

As best shown in FIGS. 3A and 3B the trimming ring is a generally L-shaped member having an anchoring leg 32. The anchoring leg 32 lies flat along the periphery of flange 24. The trimming ring 30 also includes a wall-engaging leg 34 (for metallic types) or 36 (for plastic/vinyl types). The trimming ring 30 provides an extension of the housing 10 along the wall surface 52.: The metallic type wall-engaging leg 34 has a tapering undulation for increasing the adhesiveness during installation, as discussed below.

The walls 14,16,18,20,22 each may include one or more apertures 40 for mounting electrical components thereon. Also, the flange 24 may include additional apertures 42 for mounting the electrical accessing unit within the housing 10.

Figure 6:
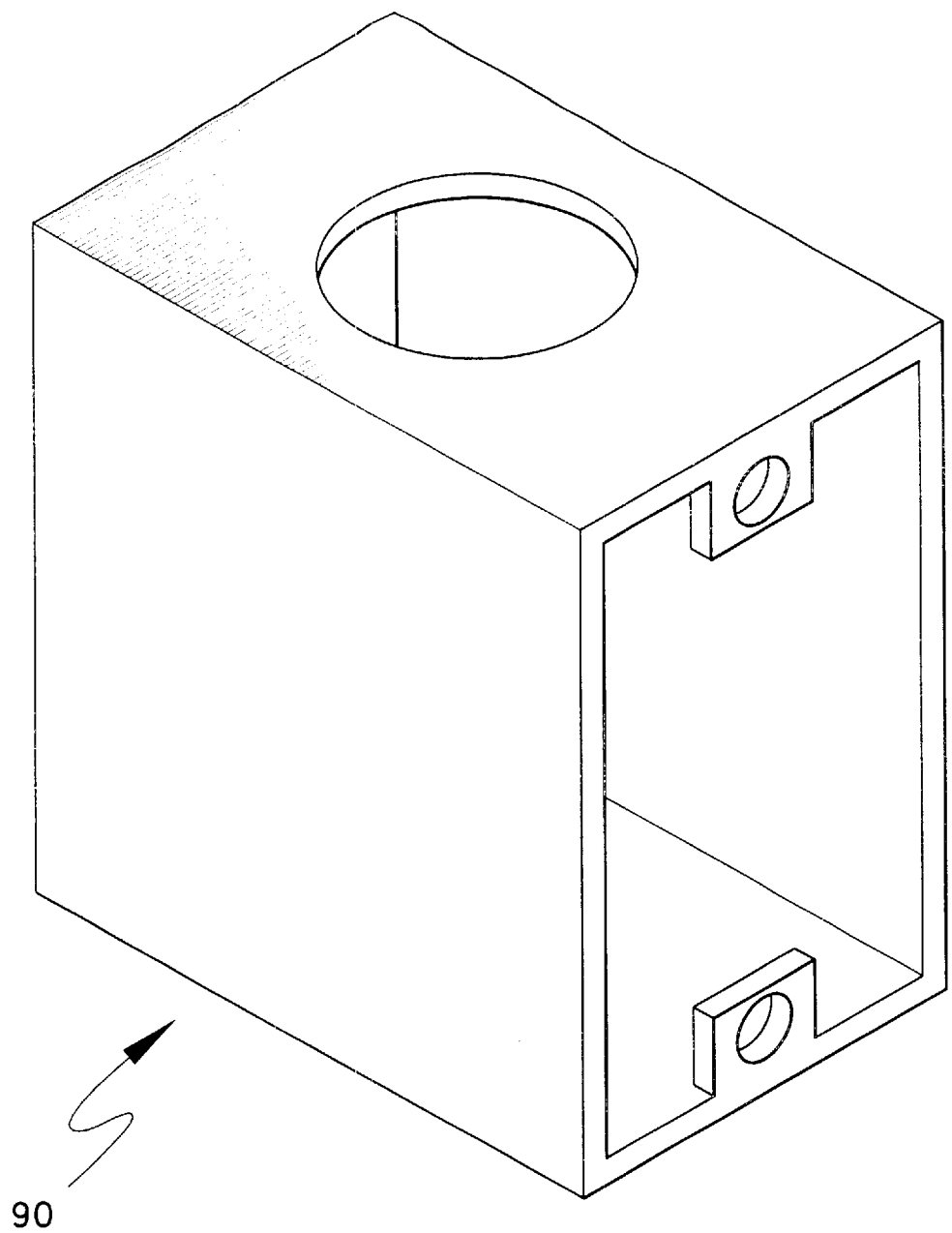
FIG. 6 is a perspective view of a conventional electrical box.

The installation of the flush-mounted decorative electrical circuit box 10 involves a few additional simple steps compared to steps required for installing a conventional circuit box 90 of FIG. 6. Installing the decorative electrical circuit box of the instant invention involves the following steps. The wall material 46 (generally wallboard, gypsum board, plaster, etc.) is perforated to form an opening for accommodating the box 10. The box is installed in the opening such that flange 24 is slightly recessed relative to the wall surface 52. The box may be mounted in any conventional manner to the wall framing 70. The wall material 46 is routed, chiseled or the like, around the opening thereof for making a recess in the wall surface. The trimming ring 30 is disposed in the routed recess overlaying flange 24 and surrounding the opening in the wall. A suitable filler material 48 is then applied over the surface of the trimming ring 30. This filler material 48 (e.g., putty compound) allows the worker to fill gaps, crevices, and spaces and to ensure that a smooth surface is presented around the edges of the wall opening. An electricity accessing unit 60 is mounted in the box 10 using the appropriate apertures 42 and conventional fasteners (not shown), after which the faceplate 50 is mounted atop the electrical accessing unit 60. The finishing procedures may include, but are not limited to painting, wallpapering, paneling, texturing, sanding and shaving. The completed installation produces an aesthetically appealing, unmarred, unflawed faceplate flush mounted with the wall surface.

It is to be understood that the present invention is not limited to the sole embodiment described above, but encompasses any and all embodiments within the scope of the following claims.

We claim:

1. A decorative electrical circuit box for establishing a flush-mounted faceplate of a wall accessible circuit unit, said decorative electrical box comprising:

a housing having a rear wall, a top wall, a bottom wall, a left side wall, a right side wall and an open front, wherein at least one of said rear wall, said top wall, said bottom wall, said left side wall and said right side wall includes an aperture formed therein;

a flange attached to said housing and encircling said open front, said flange having at least one aperture formed therein;

a L-shaped trimming ring encircling said housing and said flange, said L-shaped trimming ring having a first leg abutting said flange and a second leg abutting a wall surface wherein said trimming ring provides an extension of said housing along the wall surface.

2. The decorative electrical circuit box according to claim 1, including a faceplate positioned on said flange to cover said open front.

3. The decorative electrical circuit box according to claim 2, wherein said L-shaped trimming ring is fabricated from non-metallic material.

4. The decorative electrical circuit box according to claim 2, wherein said L-shaped trimming ring is fabricated from metallic material.

5. The decorative electrical circuit box according to claim 4, wherein said second leg of said L-shaped trimming ring is formed with a tapered, undulating surface.

* * * * *